Patented Feb. 23, 1954

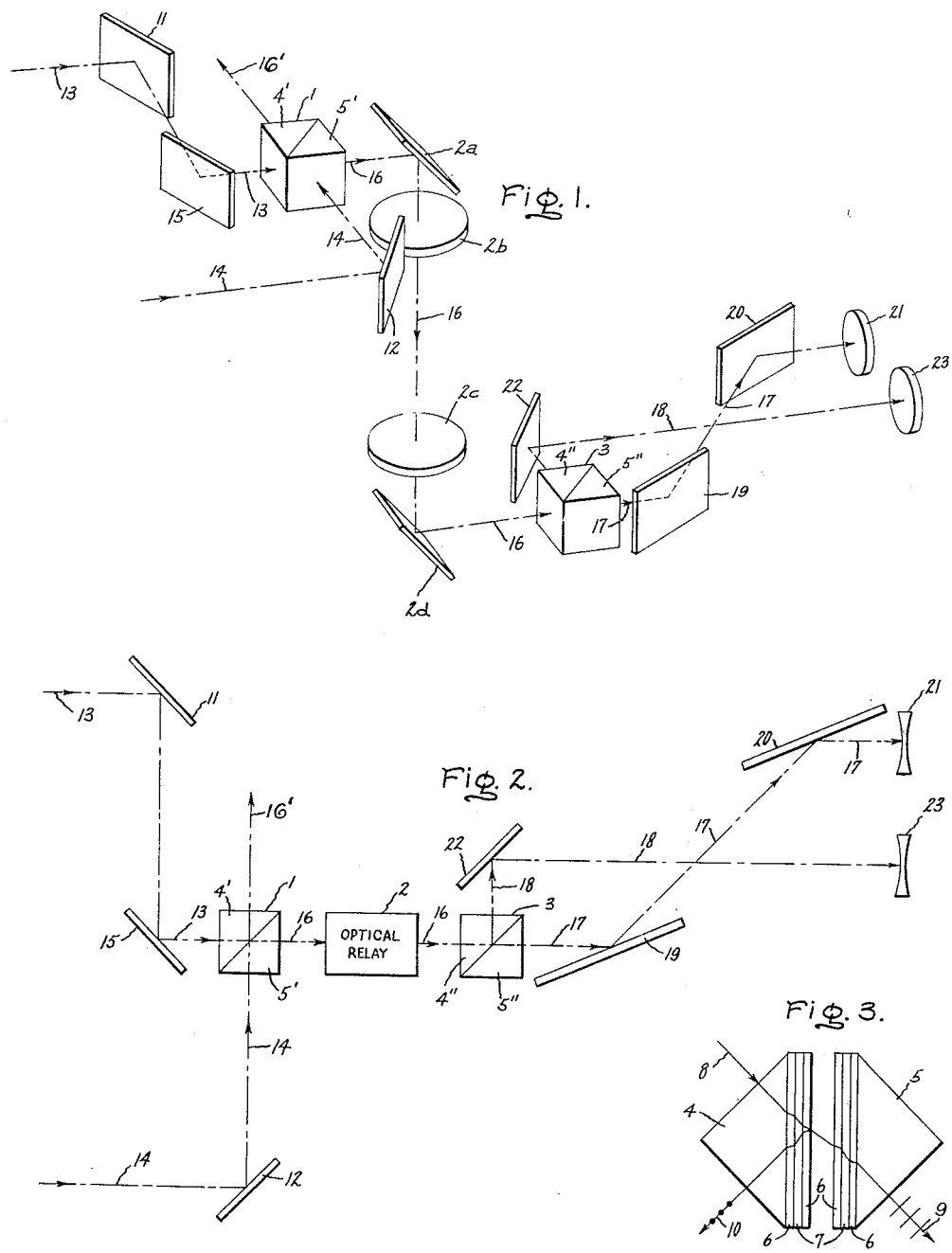

2,669,902

UNITED STATES PATENT OFFICE 2,669,902

BINOCULAR OPTICAL SYSTEM

Norman F. Barnes, Schenectady, N. Y., assignor to General Electric Company, a corporation of New York Application September 26, 1950, Serial No. 186,762

6 Claims. (Cl. 88—33)

This invention relates to binocular optical systems for achieving binocular vision through a single optical relay.

Binocular vision requires that two images be transmitted from the object viewed to the eyes of the observer. In certain optical apparatus, such as long periscopes, a provision of two optical relay systems to transmit the two images is unsatisfactory from the standpoint of complexity of mechanical design, vibration, alignment, and cost. Previous systems utilizing polarized light have been employed to transmit the two images through a single optical relay, but the efficiency of such systems has been very low, since they transmit about one-fifteenth or less of the amount of light transmitted by a comparable monocular system.

An object of the present invention is to provide a simple yet efficient binocular optical system employing a single optical relay, having a high transmission efficiency which may approach very closely fifty percent of the transmission obtainable from a comparable monocular system.

Other objects and advantages will appear as the description proceeds. The features of the invention which are believed to be novel and patentable are pointed out in the claims which form a part of this specification.

For a better understanding of the invention, reference is made in the following description to the accompanying drawing, in which Fig. 1 is a perspective view of an optical system for a binocular periscope embodying principles of this invention; Fig. 2 is a schematic view of the same optical system; and Fig. 3 is a schematic view illustrating the construction and operation of a preferred type of polarizing beam splitter used in the present invention.

Referring now to Figs. 1 and 2, a first polarizing beam splitter 1, an optical relay 2, and a second polarizing beam splitter 3 are arranged in optical alignment. Optical relay 2 may be similar to the optical relay system of a conventional monocular periscope, or any other suitable optical relay system. Relay 2 may comprise a plane mirror 2a, relay lenses 2b and 2c, and a plane mirror 2d arranged to transmit optical images from one end of the periscope to the other.

The polarizing beam splitters have the characteristic of transmitting substantially all light polarized perpendicular to a given plane, and reflecting to one side substantially all light polarized parallel to such plane. Preferably the beam splitters are of the multi-layer film type described by Banning in "Journal of the Optical Society of America," vol. 37, No. 10, October 1947, pages 796–797. Briefly, the beam splitter comprises two 45–90° prisms represented at 4 and 5, Fig. 3. A multi-layer film is deposited upon the hypotenuse face of at least one prism, and preferably upon both the hypotenuse faces, as shown in Fig. 3. These films consist of alternate layers of two materials having different indices of refraction. In a preferred form described by Banning, each film consists of two layers 6 of zinc sulphide (ZnS) between which there is a layer 7 of Cryolite. The thickness of each of these layers is approximately equal to one-quarter wavelength of light. The coated hypotenuse faces of the two prisms are placed adjacent to each other, and preferably are cemented together. In Fig. 3 the thickness of the films and the spacing between prisms is greatly exaggerated for better illustration. In actual practice the two triangular prisms are very close together, so that the complete beam splitter is approximately cubic, as shown at 1 and 3 in Figs. 1 and 2.

When unpolarized light, represented by ray 8, Fig. 3, is directed into one face of the beam splitter, the component of such light which is polarized perpendicular to the plane of the films is transmitted through the beam splitter and emerges from the opposite face, as illustrated by ray 9. Components polarized parallel to the plane of the films are reflected to one side and emerge from an adjacent face of the beam splitter, as illustrated by ray 10. The cross bars on the lines representing light rays are conventional representations of the plane of polarization. Beam splitters of this type are very efficient. The films absorb negligible amounts of light and may be more than 98% effective in splitting the beam into its polarized components; that is, in a vertically polarized ray emerging from the beam splitter the component of horizontal polarized light is less than 2%, and vice versa.

For binocular vision, an object must be viewed from two laterally spaced-apart locations. Again referring to Figs. 1 and 2, plane mirrors 11 and 12 are laterally spaced apart and respectively receive from the object viewed two beams of light represented by broken lines 13 and 14. Beam 13 is reflected from mirror 11 to plane mirror 15 and thence into the front face of beam splitter 1. This may be accomplished by placing mirror 15 in optical alignment with the front face of beam splitter 1 with its plane at an angle of substantially 45° thereto, and placing mirror 11 in optical alignment with mirror 15 with the planes of the two mirrors substantially parallel.

Mirror 12 is positioned in optical alignment with a side face of beam splitter 1 with its plane at an angle of substantially 45° thereto, and thus directs beam 14 into the side face of the beam splitter. Preferably mirrors 11 and 12 are spaced at equal lateral distances from beam splitter 1, so that beams 13 and 14 respectively travel along paths of equal optical length, thereby facilitating accurate focusing of the system. Preferably, the direction of the light beam is substantially normal to respective outer faces of the beam splitter, so that substantially no refraction of the beam occurs at these faces.

The horizontally polarized component of beam 13 is polarized perpendicular to the plane of the multilayer films between prisms 4' and 5', and therefore substantially all of this component is transmitted through the beam splitter and emerges from the back face thereof at 16. Vertically polarized components of beam 13 are polarized parallel to the plane of the film and are reflected to one side. This component is directed along path 16' and is lost from the system. Thus, fifty percent of beam 13 is transmitted by beam splitter 1, and fifty percent is reflected to one side and lost.

In a similar manner, horizontally polarized components of beam 14 are transmitted through beam splitter 1 along path 16', and are lost from the system. Vertically polarized components of beam 14 are reflected by the multilayer film and directed along path 16, where they are in substantial coincidence with the horizontally polarized components of beam 13. Fifty percent of each beam is lost from the system in beam splitter 1. This is substantially the only loss which occurs in this binocular system additional to the losses of a comparable monocular system. Therefore, the improved binocular system may transmit very close to fifty percent as much light as a monocular system of comparable size, or about seven and one-half times as much light as is transmitted by previous binocular systems employing polarized light.

As has been pointed out, beam 16 comprises the horizontally polarized component of beam 13 and the vertically polarized component of beam 14. These two components are transmitted along the common optical path 16 through relay 2 into the front face of beam splitter 3. The horizontally polarized component of beam 16, which came originally from beam 13, is polarized perpendicular to the plane of the multilayer film between prisms 4'' and 5'' of beam splitter 3. This component is transmitted by the beam splitter and directed along path 17. The vertically polarized component of beam 16, which came originally from beam 14, is reflected to one side by beam splitter 3 and directed along path 18. Beam splitter 3 thus separates the two beams without substantial loss.

A plane mirror 19 is in optical alignment with the back face of beam splitter 3 and has its plane at an angle thereto greater than 45° and less than 90°. Therefore mirror 19 reflects beam 17 in a diagonal direction, as shown, to another plane mirror 20. Mirror 20 is in optical alignment with mirror 19 and has its plane substantially parallel thereto. Mirror 20 directs beam 17 to a conventional eyepiece 21.

A plane mirror 22 is in optical alignment with a side face of beam splitter 33 and has its plane at an angle of substantially 45° thereto. Mirror 22 is positioned to direct beam 18 to a second conventional eyepiece 23. Beams 17 and 18 are made to travel along paths of equal optical length by the arrangement shown, thereby facilitating simultaneous focusing of the two beams.

Having described the principle of this invention and the best mode in which I have contemplated applying that principle, I wish it to be understood that the apparatus described is illustrative only, and that other means can be employed without departing from the true scope of the invention.

What I claim as new and desire to secure by Letters Patent of the United States is:

1. A binocular optical system comprising in optical alignment a first polarizing beam splitter having two entrance surfaces and one exit surface, and a second polarizing beam splitter having one entrance surface and two exit surfaces, said beam splitters each having the characteristic of transmitting substantially all light polarized perpendicular to one plane and reflecting to one side substantially all light polarized parallel to such plane, and means for directing two beams of unpolarized light to said first beam splitter from two different points of view for binocular observation, one of said beams impinging one one of the entrance surfaces and the other of said beams impinging on the remaining entrance surface such that the component of one beam transmitted by the beam splitter and the component of the other beam reflected by the beam splitter are polarized in mutually perpendicular planes and are directed out of said exit surface along a common optical path, an optical relay positioned in said common optical path intermediate said first and second beam splitters and comprising a lens assembly for confining and transmitting the selected components of said two beams of light to the entrance surface of said second beam splitter, said second beam splitter serving to split the selected components transmitted through the relay into two separate polarized light beams.

2. A binocular optical system comprising in optical alignment a first polarizing beam splitter having two entrance surfaces and one exit surface, and a second polarizing beam splitter having one entrance surface and two exit surfaces, said beam splitters each being of the type having a multilayer film which transmits substantially all light polarized perpendicular to its plane and reflects to one side substantially all light polarized parallel to its plane, and means for directing two beams of unpolarized light from two different points of view for binocular observation to said first beam splitter from two different mutually perpendicular directions, one of said beams impinging on one of the entrance surfaces and the other of said beams impinging on the remaining entrance surface such that the component of one beam transmitted by the beam splitter and the component of the other beam reflected by the beam splitter are polarized in mutually perpendicular planes and are directed out of said exit surface along a common optical path, an optical relay positioned in said common optical path intermediate said first and second beam splitters and comprising a lens assembly for confining and transmitting the selected components of said two beams of light to the entrance surface of said second beam splitter which separates the received components into two different polarized beams by transmitting one of the received components and reflecting the other.

3. A binocular optical system comprising in optical alignment a first polarizing beam splitter having two entrance surfaces and one exit surface, and a second polarizing beam splitter having one entrance surface and two exit surfaces, said beam splitters each being of the type consisting of two triangular prisms having mutually adjacent faces at least one of which is coated with a multilayer film to transmit substantially all light polarized perpendicular to its plane and reflect substantially all light polarized parallel to its plane, means for directing two beams of unpolarized light from two different points of view for binocular observation to respective adjacent and mutually perpendicular faces which comprise the two entrance surfaces of said first beam splitter, one of said beams impinging on one of the entrance surfaces and the other of said beams impinging on the remaining entrance surface such that the component of one beam transmitted by the beam splitter and the component of the other beam reflected by the beam splitter are polarized in mutually perpendicular planes and are directed out of said exit surface along a common optical path, an optical relay positioned in said common optical path intermediate said first and second beam splitters and comprising a lens assembly for confining and transmitting the selected components of said two beams of light to the entrance surface of said second beam splitter which separates the received components into two different polarized beams by transmitting one of the received components and reflecting the other.

4. A binocular optical system comprising in optical alignment a first polarizing beam splitter having two entrance surfaces and one exit surface, and a second polarizing beam splitter having one entrance surface and two exit surfaces, said beam splitters each being of the type consisting of two 45-90 degree triangular prisms with their hypotenuse faces adjacent to each other and separated by a film comprising alternate layers of two materials having different indices of refraction, such layers each having a thickness substantially equal to one-quarter wavelength of light, said beam splitters having the characteristic of transmitting substantially all light polarized perpendicular to the plane of the film and reflecting to one side substantially all light polarized parallel to the plane of the film, means for directing two beams of unpolarized light from two different points of view for binocular observation normal to respective perpendicular faces which comprise the two entrance surfaces of said first beam splitter, one of said beams impinging on one of the entrance surfaces and the other of said beams impinging on the remaining entrance surface such that the component of one beam transmitted by the beam splitter and the component of the other beam reflected by the beam splitter are polarized in mutually perpendicular planes and are directed out of the exit surface along a common optical path, an optical relay positioned in said common optical path intermediate said first and second beam splitters and comprising a lens assembly for confining and transmitting the selected components of said two beams of light to the entrance surface of said second beam splitter which separates the two components by transmitting one and reflecting the other.

5. A binocular optical system comprising in optical alignment a first polarizing beam splitter, and a second polarizing beam splitter, said beam splitters each having the characteristic of transmitting substantially all light polarized perpendicular to one plane and reflecting to one side substantially all light polarized parallel to such plane, a pair of mirrors positioned and arranged to direct a first beam of unpolarized light into the front of said first beam splitter, a mirror positioned to direct a second beam of unpolarized light into one side of said first beam splitter so that the component of one beam transmitted by the beam splitter and the component of the other beam reflected by the beam splitter are polarized in mutually perpendicular planes and are directed along a common optical path, an optical relay positioned in said common optical path intermediate said first and second beam splitters and comprising a lens assembly for confining and transmitting the selected components of said two beams of light into the front of said second component splitter which transmits one beam and reflects the other, first and second eyepieces, a pair of mirrors positioned and arranged to direct one component from said second beam splitter into said first eyepiece and a mirror positioned to direct the other component from said second beam splitter into said second eyepiece.

6. A binocular optical system comprising in optical alignment a first polarizing beam splitter, an optical relay, and a second polarizing beam splitter, said beam splitters each having parallel front and rear faces and side faces perpendicular thereto, said beam splitters each having the characteristic of transmitting between opposite faces substantially all light polarized perpendicular to a diagonal plane between such faces and reflecting to one side substantially all light polarized parallel to such plane, a first plane mirror in optical alignment with the front face of said first beam splitter and having its plane at an angle of substantially 45 degrees thereto, a second plane mirror in optical alignment with and having its plane substantially parallel to said first mirror, whereby a first beam of unpolarized light is directed into the front face of the first beam splitter, a third plane mirror in optical alignment with a side face of said first beam splitter and having its plane at an angle of substantially 45 degrees thereto whereby a second beam of unpolarized light is directed into such side face, so that the component of the first beam transmitted by the first beam splitter and the component of the second beam reflected by the first beam splitter are polarized in mutually perpendicular planes and are directed along a common optical path from the back face of said first beam splitter through said relay into the front face of said second beam splitter which transmits one beam to its back face and reflects the other beam through one of its side faces, first and second eyepieces, a fourth plane mirror in optical alignment with the back face of said second beam splitter and having its plane at an angle thereto greater than 45° and less than 90°, a fifth plane mirror in optical alignment with and having its plane substantially parallel to said fourth mirror positioned to direct the beam transmitted by the second beam splitter into said first eyepiece, and a sixth plane mirror in optical alignment with a side face of said second beam splitter and having its plane at an angle of substantially 45° thereto positioned to direct the beam reflected by the second beam splitter into said second eyepiece.

NORMAN F. BARNES.

(References on following page)

References Cited in the file of this patent

UNITED STATES PATENTS

| Number | Name | Date |
|---|---|---|
| 1,870,465 | Rathbun | Aug. 9, 1932 |
| 2,100,348 | Nicolson | Nov. 30, 1937 |
| 2,118,160 | Cawley | May 24, 1938 |
| 2,123,743 | Pratt | July 12, 1938 |
| 2,178,145 | Manly | Oct. 31, 1939 |
| 2,241,041 | Sauer | May 6, 1941 |
| 2,262,524 | Ball | Nov. 11, 1941 |
| 2,282,947 | Sherbinin | May 12, 1942 |
| 2,373,249 | Lurcott | Apr. 10, 1945 |
| 2,403,731 | MacNeille | July 9, 1946 |
| 2,418,627 | Dimmick | Apr. 8, 1947 |

FOREIGN PATENTS

| Number | Country | Date |
|---|---|---|
| 224,393 | Great Britain | Nov. 13, 1924 |